(12) United States Patent
Menke et al.

(10) Patent No.: US 6,773,586 B2
(45) Date of Patent: Aug. 10, 2004

(54) FLOTATION DEVICE

(75) Inventors: Lucas Menke, Grünwald (DE); George Troubounis, Munich (DE)

(73) Assignee: Meri Entsorgungstechnik für die Papierindustrie GmbH, Munich (DE)

( * ) Notice: Subject to any disclaimer, the term of this patent is extended or adjusted under 35 U.S.C. 154(b) by 0 days.

(21) Appl. No.: 09/965,673

(22) Filed: Sep. 26, 2001

(65) Prior Publication Data

US 2002/0096475 A1 Jul. 25, 2002

(51) Int. Cl.[7] .......................... C02F 1/24; B01D 21/02; B01D 17/028
(52) U.S. Cl. .................. 210/221.2; 210/519; 210/521; 210/522
(58) Field of Search .................. 210/221.2, 519, 210/521, 522

(56) References Cited

U.S. PATENT DOCUMENTS

| | | | |
|---|---|---|---|
| 3,182,799 A | | 5/1965 | Krofta |
| 3,754,656 A | * | 8/1973 | Horiguchi et al. |
| 4,086,169 A | * | 4/1978 | Skarheim |
| 4,299,703 A | * | 11/1981 | Bezard et al. |
| 5,650,044 A | * | 7/1997 | Serres |
| 5,662,804 A | | 9/1997 | Dufour |
| 5,840,198 A | * | 11/1998 | Clarke |
| 6,174,435 B1 | * | 1/2001 | Kaltchev |

FOREIGN PATENT DOCUMENTS

DE         2 147 916         4/1972

* cited by examiner

Primary Examiner—Thomas M. Lithgow
(74) Attorney, Agent, or Firm—Howrey Simon Arnold & White, LLP; Matthew Rainey

(57) ABSTRACT

A flotation device for separating materials or mixtures of materials from suspensions includes a reaction and mixing space (18) with eccentric inlet (16) for the mixture of suspension particles with gas bubbles and for further transport into at least one centrally arranged vertical suspension distribution tube (26), wherein the suspension distribution tube (26) and the clarified fluid collecting tube (48) are arranged adjacently, the plates (30) surround the suspension distribution tube (26) and the clarified fluid collecting tube (48) in an annular manner; and every second annular plate space (31) between adjacent plates (30) is connected to the suspension distribution tube (26) and every other space (31) between plates is connected to the clarified fluid collecting tube (48), so that the flow takes place out of one space (31) between plates from the inside towards the outside to the separating space (32), and subsequently into an adjacent space (31) between plates from the outside towards the inside. The substantive advantages of the invention are in that by combination of the plate arrangement with the eccentrically loaded reaction and mixing space, improved flocculation and thus better processing values are obtained in the filtrate. Better separation values are obtained by separation using the double-plate principle.

16 Claims, 3 Drawing Sheets

FLOTATION DEVICE

The invention relates to a flotation device for separating materials or mixtures of materials from suspensions in order to form at least one high material content fraction and one low material content fraction, with several rotationally symmetrical plates arranged one above another in a flotation tank, wherein during the separation procedure the low material content fraction enters into the plate spaces between the plates and arrives at a clarified fluid collection tube, and horizontally outside the plates a vertically extending annular separating space is formed that communicates with a run-off provided above the plates for the high material content fraction.

A flotation device of rectangular plan is known from U.S. Pat. No. 3,182,799, in which there are outwardly orientated plates, wherein in the space between each two plates there is a suspension inlet above, and beneath this a clarified fluid outlet, wherein between the inlet and outlet there are short deflecting plates. This arrangement has the disadvantage that because of the dimensioning of the deflecting plates in particular, with elevated hydraulic loading (high pressures or throughputs) a "short-circuit flow" occurs from the inlet to the outlet that drastically impairs the separation efficiency. Further, cleaning of the installation, as is necessary in particular in the paper industry when colours are changed, is very complex due to the separate supply lines.

Proceeding from this, the object of the invention is to provide a flotation device as described in the preamble, which avoids the disadvantages described hereinabove, and is distinguished in particular by efficacious separation of the desired materials from the suspension into a high material content fraction and a low material content fraction.

This object is solved according to the features described in claim 1. Advantageous further developments will be evident from the dependent claims.

The substantive advantages of the invention are in that the surface area of the installation is reduced in comparison with horizontal flotation devices, and thus the flotation capacity is greater per surface area of the installation. By combination of the plate arrangement and the eccentrically loaded reaction and mixing space, there is improved flocculation, and thus better processing values, in the filtrate. By separating using the double plate principle, better separation values are obtained.

Figure 1:
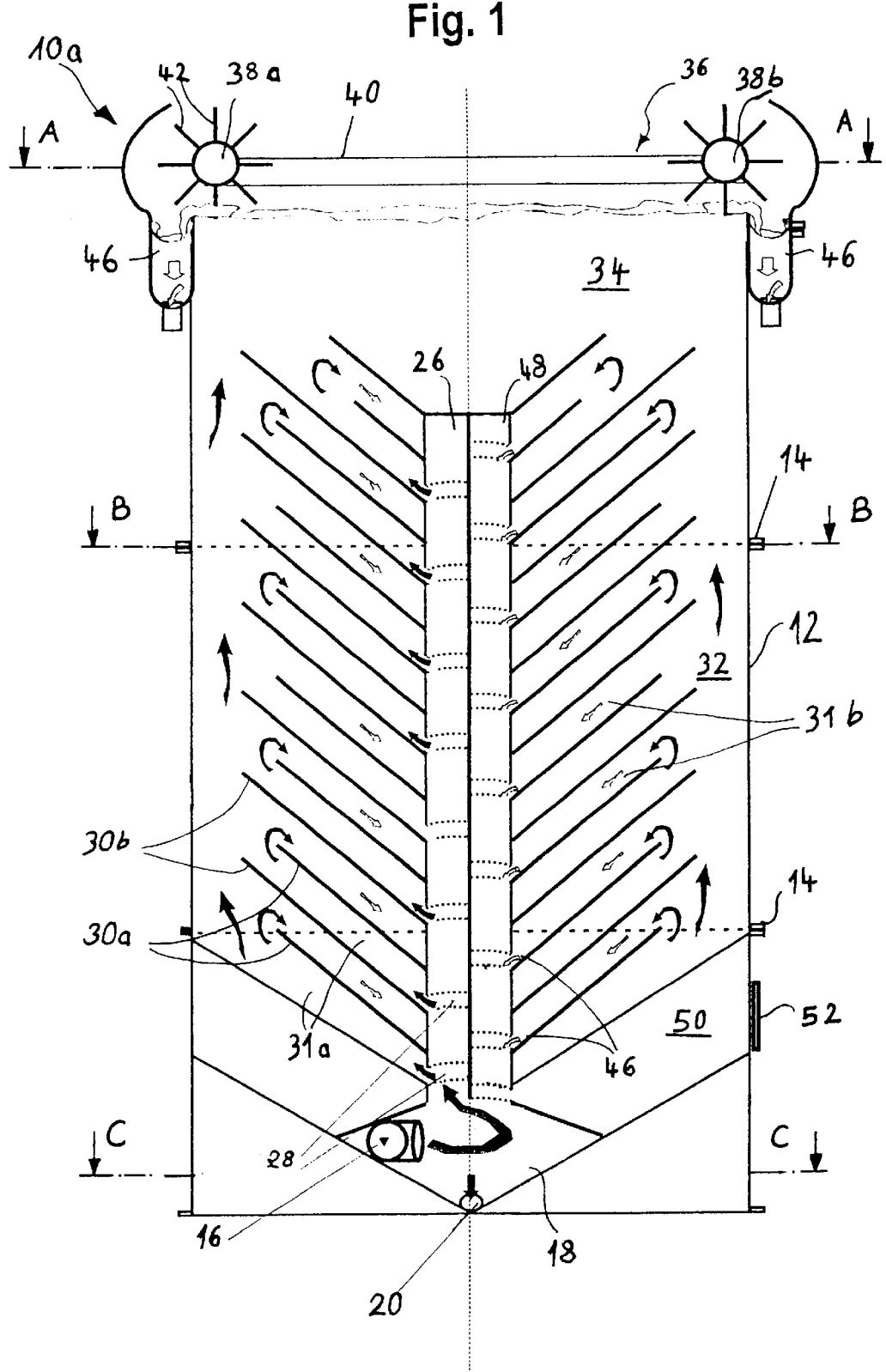
Figure 2A:
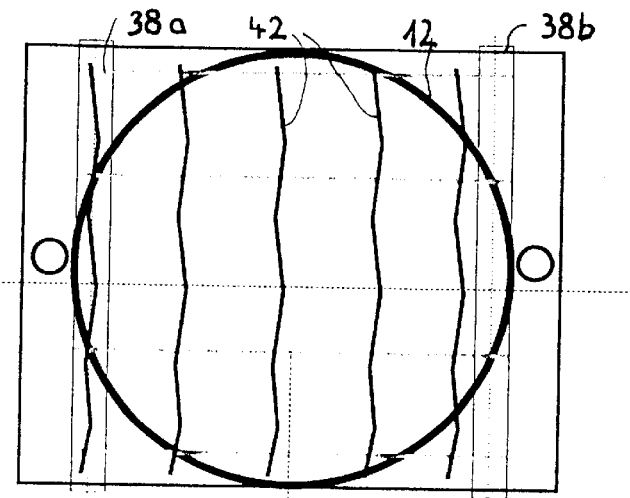
Figure 2B:
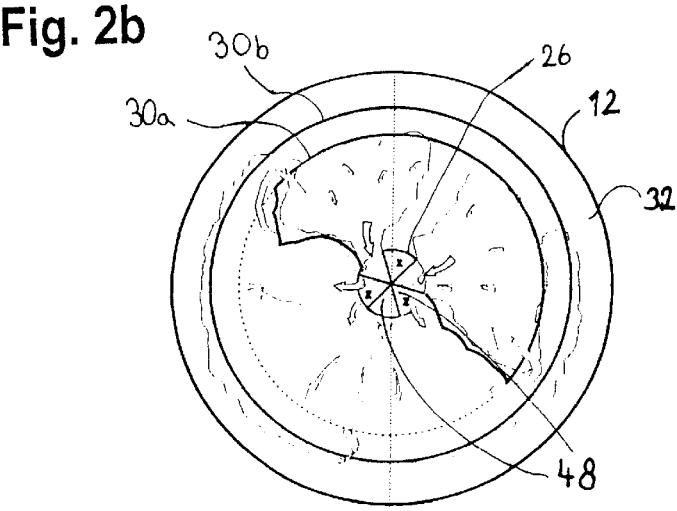
Figure 2C:
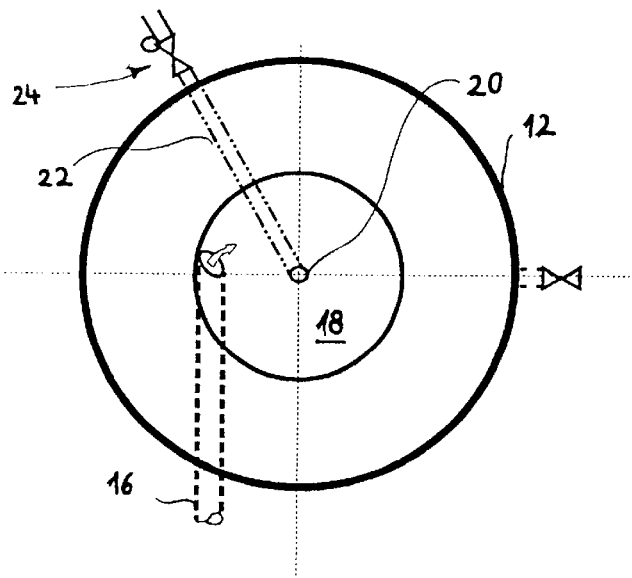
Figure 3:
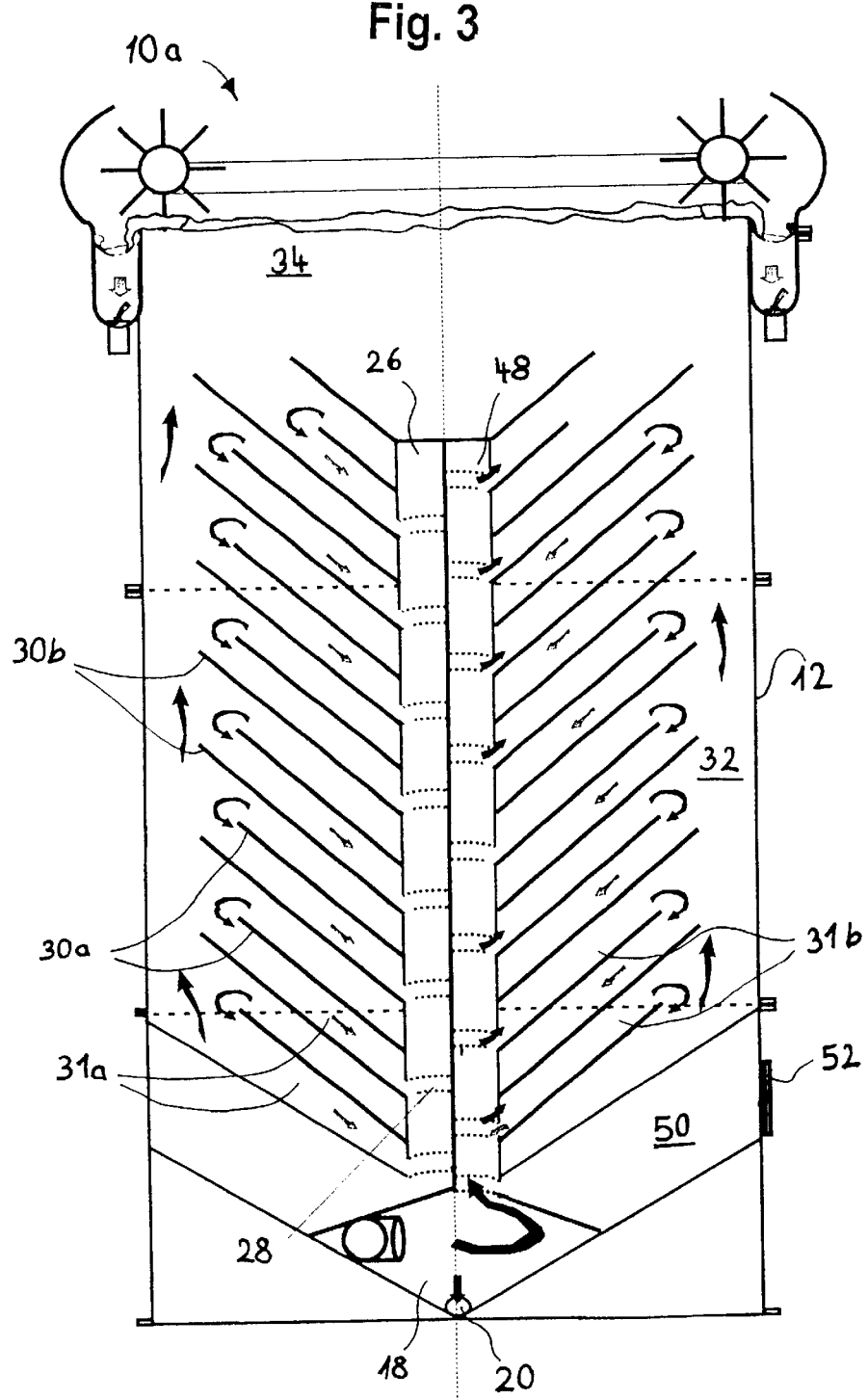

The invention will be described in more detail hereinafter with reference to the attached drawings. There is shown, in:

FIG. 1 a schematic axial section through a first embodiment of the according to the invention with a flotation device;

FIG. 2 three schematic cross-sections through the flotation device according to FIG. 1 along the lines A—A, B—B and C—C;

FIG. 3 a schematic axial section through a second embodiment of the according to the invention with a flotation device;

In FIG. 1 a first embodiment of the invention is shown in schematic axial section, that is to say a flotation device 10a. In FIGS. 2a, 2b and 2c three cross-sections through the flotation device 10a along the lines A—A (FIG. 2a); B—B (FIG. 2b) and C—C (FIG. 2c) are shown.

With reference to FIGS. 1 and 2, the flotation device 10a is substantially composed of a round flotation tank 12, at the bottom end of which is the suspension inlet and the clarified fluid outlet, and at the top end of which the run-off for the flotation product is provided. As indicated by the flange 14, the flotation tank can be constructed from several segments.

In detail, in the lower region of the flotation device 10a a suspension inlet is provided that opens out eccentrically into a double-cone reaction and mixing space 18. In the conical base region of the reaction and mixing space 18 a sediment outlet 20 is provided that is connected to a sediment line 22 that is closed with a time-controlled sediment valve 24.

The upper cone of the reaction and mixing space 18 opens out into at least one suspension distribution tube 26 arranged vertically approximately in the centre of the flotation tank 12, said tube being provided with a large number of preferably slit-shaped suspension outlets 28 into the inside of the flotation tank 12.

In the flotation tank 12, and surrounding the at least one suspension distribution tube 26 in an annular manner, a large number of annular plates extending conically upwards are arranged, wherein every second plate 30a is configured shorter in the radial direction, and every other plate 30b longer. The suspension outlets 28 open out into first annular plate spaces 31a that are respectively delimited at the bottom by a long plate 30b and above by a short plate 30a. Alternating with the first annular plate spaces 31a, second annular plate spaces 31b are configured that are delimited at the bottom by a short plate 30a and above by long plate 30b.

Outside the long plates 30b radially as far as the wall of the flotation tank 12 there is an annular separating space 32 that communicates with the flotation product collection space 34 provided in the upper region of the flotation tank 12. Here, a paddle device 36 is mounted in the flotation tank 12, which device includes a plurality of volume paddles 42 rotating by means of two roller arrangements 38a, 38b and continuous bands 40, which paddles are immersed in the flotation product collection space 34 and lead into a circumferential flotation product drainage channel 44.

The second annular plate spaces 31b have at their inside extremity preferably slit-shaped clarified fluid outlets 46 by means of which a connection to at least one clarified fluid collecting tube 48 is formed. The at least one clarified fluid collecting tube 48 opens out in turn into a clarified fluid reservoir 50 that communicates with a clarified fluid drain aperture 52 that is provided with a control valve, not shown, for adjusting the liquid level in the flotation tank 12.

As is evident from FIG. 2b, a plurality of suspension distribution tubes 26 and a plurality of clarified fluid collecting tubes 48 are combined into a cellular tube that is composed of a plurality of parallel tubes that are sector-shaped in cross-section, wherein every second sector-shaped tube forms a suspension distribution tube 26 and every other sector-shaped tube forms a clarified fluid collecting tube 48. The cellular tube is circular in cross-section in the embodiment shown. It can alternatively also be polygonal, in particular square, and in particular also be composed of four square tubes arranged adjacently in a square, each two opposite tubes of which are suspension distribution tubes 26 and the other tubes are clarified fluid collecting tubes 48.

The plates 30 are shown in FIG. 2b with a circular cross-section. Other shapes such as polygons, in particular a square, can also find application. The shorter plates 30a are approximately 5% to 40%, preferably 10% to 20% shorter than the longer plates 26b.

The separating space 26 is preferably of a width corresponding to between 10% and 30% of the length of the longer plates 30b.

In operation, a suspension, preferably water-based, which can also include heavy particles, is introduced eccentrically, via the suspension inlet 16, tangentially into the reaction and mixing space 18. The suspension can be mixed with gas bubbles either before entry into the reaction and mixing space 18 or shortly afterwards and/or chemical or physical flocculating agents can be added. By means of the tangential inflow of the suspension into the reaction and mixing space 18, efficacious separation occurs of the heavy particles which sink down and are removed via the sediment outlet 20.

The suspension mixed with flocculating agent and/or gas bubbles flows out of the reaction and mixing space 18 into the suspension distribution tube 26 arranged above, and from there via the suspension outlets into the first annular plate space 31a. The suspension then flows, slowing down continuously, radially outwards and arrives in the separating space 32. In this way separation of the suspension into clarified fluid and the materials to be separated, that is to say solids, dissolved and partly dissolved materials, increasingly occurs. While the materials to be separated in the separating space flow upwards towards the flotation collection space 34, the mass of clarified fluid flows into the second annular plate spaces 31b that are arranged alternating with the first annular plate spaces 31a. The clarified fluid flows through the annular plate spaces 31b diagonally downwards and inwards, wherein a further separation occurs of the solids, dissolved solids and partly dissolved solids, which flow back upwards and outwards to the separating space 32. The clarified fluid flows via the slit-shaped clarified fluid outlets 46 into the clarified fluid collecting tube 48 and from there into the clarified fluid drainage aperture 50, from where it is taken off from the flotation device 10a in a controlled manner by means of the clarified fluid run off aperture 52 provided with a control valve.

In FIG. 3 a second embodiment of the invention is shown, in which like reference signs refer to like elements in FIGS. 1 and 2. This second embodiment of the invention differs from the first simply in that the inflow of the suspension occurs from the suspension distribution tube 26 via the suspension outlets 28 into second annular plate spaces 31b that are delimited respectively at the bottom by a short plate 30a and above by a long plate 30b. Correspondingly, the flow of the clarified fluid occurs from the separating space 32 into the first annular plate spaces 31a that are delimited respectively at the bottom by a long plate 30b and above by a short plate 30a.

Because of this difference the main flow of the clarified fluid is downwards and consequently contrary to the main flow of the solid materials, dissolved and partly dissolved materials that takes place upwards towards the flotation product collection space 34. By means of this counter-flow and the turbulences generated thereby, for specific suspension compositions there is better separation than with the embodiment according to FIGS. 1 and 2.

The invention can be used preferably in water preparation in paper factories or sewage works. The suspension contains, for example as solids: fibres, mineral particles or micro-organisms, as partly dissolved materials: colloid materials, fats, dye pigments, and as dissolved materials: carbohydrates, salts, organic acids or inorganic acids.

What is claimed is:

1. Flotation device for separating materials or mixtures of materials from suspensions to form at least one high material content fraction and one low material content fraction, with several rotationally symmetrical plates arranged one above another in a flotation tank, wherein during the separating procedure, the low material content fraction enters into plate spaces between the plates and arrives at a clarified fluid collecting tube, wherein horizontally outside the plates, a vertically extending annular separating space is formed that communicates with a run-off for the high material content provided above the plates, characterised by
    a reaction and mixing space (18) with eccentric inlet (16) for mixing the suspension particles with gas bubbles and for further conveyance into at least one centrally arranged vertical suspension distribution tube (26);
    wherein the suspension distribution tube (26) and the clarified fluid collecting tube (48) are arranged adjacently;
    the plates (30) surround the suspension distribution tube (26) and the clarified fluid collecting tube (48) in an annular manner;
    every second annular plate space (31) between adjacent plates (30) is connected to the suspension distribution tube (26) and every other space between plates (31) is connected to the clarified fluid collecting tube (48), so the flow takes place from one space between plates (31) from the inside to the outside towards the separating space (32) and subsequently into an adjacent space between plates (31) from the outside to the inside.

2. Flotation device according to claim 1, characterised in that the plates (30) and/or the flotation tank (12) are configured round or regularly polygonal.

3. Flotation device according to claim 2, characterised in that the plates (30) are configured substantially conically or, conversely, pyramid-shaped.

4. Flotation device according to claim 3, characterised in that the plates (30) are inclined upwards in the radial direction.

5. Flotation device according to claim 1, characterised in that in the radial direction, shorter plates (30a) and longer plates (30b) are arranged alternately one above another.

6. Flotation device according to claim 5, characterised in that a first annular plate spacing (31a) formed below by a longer plate (30b) and above by a shorter plate (30a) is connected to the suspension distribution tube (26) and a second annular plate spacing (31a) formed below by a shorter plate (30a) and above by a longer plate (30b) is connected to the clarified fluid collecting tube (48).

7. Flotation device according to claim 5, characterised in that a second annular plate spacing (31b) formed below by a shorter plate (30a) and above by a longer plate (30b) is connected to the suspension distribution tube (26) and a first annular plate spacing (31a) formed below by a longer plate (30b) and above by a shorter plate (30a) is connected to the clarified fluid collecting tube (48).

8. Flotation device according to claim 5, characterised in that the shorter plates (30a) are 5% to 40% shorter in the radial direction than the longer plates (30b).

9. Flotation device according to claim 5, characterised in that the separating space (32) between the ends of the plates (30) and the wall of the flotation tank (12) has an extent between 10% and 30% of the extent of the longer plates (30b) in the radial direction.

10. Flotation device according to claim 1, characterised in that the inclination of the plates with respect to the horizontal is between 10° and 60°, preferably between 30° and 50°.

11. Flotation device according to claim 1, characterised in that a conduit is arranged centrally in the flotation tank (12), which conduit includes both the at least one suspension distribution tube (26) and the at least one clarified fluid collecting tube (48).

12. Flotation device according to claim 11, characterised in that the conduit is divided into at least two sector-shaped conduits, one of which sector-shaped conduits forms the suspension distribution tube (26) and the second conduit of which forms the clarified fluid collecting tube (48).

13. Flotation device according to claim 12, characterised in that the conduit is divided into 4 to 8, preferably 6 sector-shaped conduits, wherein the suspension distribution tubes (26) and clarified fluid collecting tubes (48) alternate in the direction of the periphery.

14. Flotation device according to claim 11, characterised in that in the conduit, horizontal through-flow slits (28, 46) are configured approximately the width of the sectors for discharge of the suspension from the suspension distribution tube (26), and for letting in the clarified fluid into the clarified fluid tube (48) into and respectively out of the associated annular plate spaces (31).

15. Flotation device according to claim 1, characterised in that the reaction and mixing space (18) is configured as a double cone, wherein the upper cone opens out into the at least one suspension distribution tube (26) and the lower cone into a sediment drain (20).

16. Flotation device according to claim 1, characterised in that it includes a base unit, a lid unit and several plate units that can be assembled vertically one above another, wherein each plate unit includes distribution and collecting tube sections, annular space external wall sections, and several plates (30).

* * * * *

UNITED STATES PATENT AND TRADEMARK OFFICE
CERTIFICATE OF CORRECTION

PATENT NO. : 6,773,586 B2
DATED : August 10, 2004
INVENTOR(S) : Lucas Menke et al.

It is certified that error appears in the above-identified patent and that said Letters Patent is hereby corrected as shown below:

<u>Title page,</u>
Insert Item -- [30] Foreign Application Priority Data
          Sep. 27, 2000   (DE) ………………………………. 100 47 958.8 --

Signed and Sealed this

Second Day of November, 2004

JON W. DUDAS
*Director of the United States Patent and Trademark Office*